United States Patent Office 3,427,324
Patented Feb. 11, 1969

3,427,324
DERIVATIVES OF CHROMONE-2-CARBOXYLIC ACID
Colin Fitzmaurice, Holmes Chapel, England, assignor to Fisons Pharmaceuticals Limited, Loughborough, England
No Drawing. Continuation-in-part of application Ser. No. 398,756, Sept. 23, 1964. This application Jan. 16, 1967, Ser. No. 610,212
U.S. Cl. 260—340.7    16 Claims
Int. Cl. C07d 7/34, 13/08; A61k 13/00

ABSTRACT OF THE DISCLOSURE

Compounds of the formula:

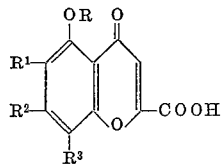

and their salts, esters and amides, wherein the variables are defined in the following specification, for example:

5-(2-hydroxypropoxy)chromone-2-carboxylic acid;
5-(2-phenoxyethoxy)chromone-2-carboxylic acid;
5-(2-hydroxypropoxy)-7-methyl-chromone-2-carboxylic acid;
5-(2-ethoxyethoxy)chromone-2-carboxylic acid;
5-(2-acetoxypropoxy)chromone-2-carboxylic acid;
5-(tetrahydrofurfurylmethoxy)chromone-2-carboxylic acid;
5-[4-(1,3-dioxan-4-ylmethoxy)]chromone-2-carboxylic acid;
5,7-bis-(2-ethoxyethoxy)chromone-2-carboxylic acid; and
4-(2-ethoxyethoxy)-9-methoxy-5-oxo-5H-furo[3,2-g][1]benzo-pyran-7-carboxylic acid.

and are useful in the treatment of asthma and the like.

---

The present application is a continuation-in-part of co-pending application Ser. No. 398,756, filed September 23, 1964, now abandoned.

This invention is concerned with new chromone derivatives, as hereinafter defined possess activity as inhibitors It has now been found that certain chromone derivatives, as hereinafter defined posses activity as inhibitors of the effects of certain types of antigen-antibody reaction.

According to the invention, therefore, there are provided as new compounds, chromone carboxylic acids of the formula:

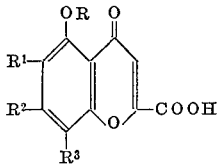

and salts, esters and amides thereof, in which R is an alkyl group substituted by one or more hydroxyl groups or by a carboxyl group, an alkyl or aralkyl group interrupted by one or more oxygen atoms and which may be substituted by one or more hydroxyl groups, a heterocyclic ring containing carbon and oxygen which ring may be substituted by one or more hydroxyl groups, or an alkyl group substituted by a heterocyclic ring containing carbon and oxygen, which ring may be substituted by one or more hydroxyl groups or by one or more alkyl groups; and $R^1$, $R^2$ and $R^3$ are the same or different and each is a hydrogen or a halogen atom (for example a chlorine or bromine atom), a lower alkyl group (for example a methyl or ethyl group) an alkoxy group (for example a methoxy or ethoxy group) or a group OR where R has the meaning defined above; or $R^1$ and $R^2$ or $R^2$ and $R^3$ together with the adjacent carbon atoms form a saturated or unsaturated carbocyclic ring or an oxygen containing heterocyclic ring for example a benzene, cyclohexane, cyclopentane, cyclopropane or furane ring.

Salts of the chromone-2-carboxylic acid which may be mentioned are salts with physiologically acceptable cations, for example metal salts such as alkali metal salts (e.g., sodium, potassium and lithium salts) and alkaline earth metal salts (e.g., magnesium and calcium salts) and salts with organic bases, e.g., amine salts such as piperidine salts, triethanolamine salts and diethylaminoethylamine salts.

Esters which may be mentioned include simple esters such as methyl, ethyl etc. esters and amides which may be mentioned include simple amides with ammonia and monoalkylamines and dialkylamines, and more complex amides with amino acids such as glycine. Where the group R contains one or more hydroxyl groups, such hydroxyl groups may be esterified, for example, in the form of their acetates, hemisuccinates or carbamates.

Where the group R is an alkyl group substituted with be in the form of salt, ester or amide and is not necessarily in the form of the same functional derivative as the carboxy group in the 2-position. Thus, for example, a carboxy substituent in the group R may be in the form of an amide whilst the carboxy group at the 2-position is in the form of a salt, e.g., a sodium salt.

Where the group R is an alkyl group substituted with one or more hydroxy groups, it is preferred that the alkyl group contains at least two carbon atoms and not more than eight carbon atoms. Examples of hydroxyalkyl groups include hydroxyethyl, hydroxypropyl, dihydroxypropyl, hydroxybutyl, dihydroxybutyl and trihydroxybutyl. Where the group R is an alkyl group interrupted by one or more oxygen atoms, it is preferred that the alkyl group contains at least two carbon atoms but not more than ten carbon atoms. Examples of such groups include methoxymethyl, ethoxymethyl, ethoxyethyl, hydroxyethoxyethyl, ethoxypropyl and acetoxymethyl.

Examples of the group R when it is a heterocyclic ring or alkyl group substituted with a heterocyclic ring include furfuryl, tetrahydrofurfuryl, and dioxolanyl and substituted dioxolanyl, e.g., groups of the formula:

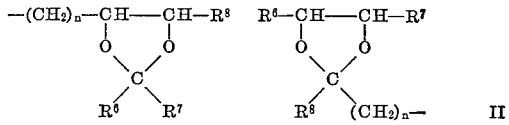

where $R^6$, $R^7$ and $R^8$ are alkyl groups or hydrogen atoms and $n$ is zero or an integer. The definition of R as a heterocyclic ring or an alkyl group substituted with a heterocyclic ring is also intended to cover saccharide rings, e.g., when R is a glucosyl or ribosyl group.

Preferred compounds according to the invention are:

5-(2-hydroxypropoxy)chromone-2-carboxylic acid;
5-(2-phenoxyethoxy)chromone-2-carboxylic acid;
5-(2-hydroxypropoxy)-7-methyl-chromone-2-carboxylic acid;
5-(2-ethoxyethoxy)chromone-2-carboxylic acid;
5-(2-acetoxypropoxy)chromone-2-carboxylic acid;
5-(tetrahydrofurfurylmethoxy)chromone-2-carboxylic acid;
5-[4-(1,3-dioxan-4-ylmethoxy)]chromone-2-carboxylic acid;
5,7-bis-(-2-ethoxyethoxy)chromone-2-carboxylic acid; and
4-(2-ethoxyethoxy)-9-methoxy-5-oxo-5H-furo[3,2-g] [1]benzopyran-7-carboxylic acid.

The new chromone derivatives according to the invention have been shown to inhibit the release and/or action of toxic products which arise from the combination of certain types of specific antigen and antibody, e.g. the combination of reaginic antibody with specific antigen.

Thus the new compounds are of value in the treatment of conditions in which antigen-antibody reactions are responsible for disease, for example asthma, hay fever, urticaria and autoimmune diseases.

In man it has been found that both subjective and objective changes which result from the inhalation of specific antigen are inhibited by prior administration of the new chromone derivatives which are, thus, of value in the prophylactic treatment of asthma.

According to a further embodiment of the invention, therefore, there is provided a pharmaceutical composition comprising a chromone derivative according to the invention in association with a pharmaceutical carrier or diluent.

The nature of the composition and the pharmaceutical carrier or diluent will, of course, depend upon the desired route or administration, i.e., orally, parenterally or by inhalation.

In general, for the prophylactic treatment of asthma, the composition will be in a form suitable for administration by inhalation. Thus the composition may comprise a suspension or solution of the active ingredient in water for administration by means of a conventional nebulizer. Alternatively the compositions may comprise a suspension or solution of the active ingredient in a conventional liquified propellant, such as dichlorodifluoromethane or chlorotrifluoroethane, to form a so-called "aerosol" composition to be administered from a pressurised container. The composition may also comprise the solid active ingredient diluted with a solid diluent, e.g., lactose, for administration from a powder inhalation device.

The pharmaceutical compositions of the invention generally comprise a minor proportion of active chromone ingredient and a major proportion of carrier or diluent. Thus, for example, the solutions for administration by a conventional nebulizer will comprise a dilute solution, e.g., containing up to about 10% of the active ingredient in sterile water, and compositions comprising suspensions or solutions in pressurised propellants will contain, for example, about 2-5% of the active ingredient. However, where the composition comprises the solid active ingredient diluted with a solid diluent, the diluent may be present in less, equal or greater amount than the solid active ingredient, for example the diluent may be present in an amount of from 50 to 150% by weight of solid active ingredient.

The invention also includes within its scope a method of inhibiting the effects of the antigen-antibody reaction which comprises the prior application to the area of the antigen-antibody mechanism a therapeutically effective amount of a chromone derivative as defined above, preferably in the form of a salt.

According to a particular embodiment, the invention is for a method of relieving or preventing allergic airway obstruction which comprises administering to the patient a therapeutically effective amount at suitable intervals, of a chromone derivative as defined above, particularly in the form of a salt.

The compounds according to the invention may be prepared in various ways.

According to one embodiment of the invention, therefore, there is provided a process for the preparation of chromone-2-carboxylic acids and esters thereof of the formula:

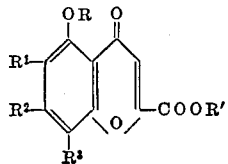

III in which R, $R^1$, $R^2$, and $R^3$ have the meanings defined above and R' in a hydrogen atom or an alkyl group which comprises cyclising by heating, if desired in the presence of a cyclisation catalyst, an alpha-gamma diketo ester of the formula:

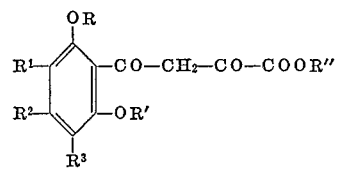

IV in which R" is a lower alkyl group and thereafter, if desired, hydrolysing the ester, if formed, to yield the desired acid.

The cyclisation may be effected directly by heating the alpha-gamma diketo-ester in the absence of any cyclisation catalyst in the presence of a solvent such as dehydrated glycerol. Alternatively the cyclisation may be carried out by heating in the presence of a suitable solvent such as glacial acetic acid containing a small amount of hydrochloric or hydrobromic acid, concentrated sulphuric acid, a solution of sodium acetate in boiling acetic acid or in the presence of ethanol containing a small amount of hydrogen chloride.

Depending upon the exact conditions of cyclisation the product formed may be in the form of an ester or a free acid. Where the ester is formed this may be converted to the free acid by hydrolysis by, for example, heating with the equivalent of sodium hydroxide in ethanol, with aqueous sodium bicarbonate, or by heating with dilute aqueous mineral acid, if necessary in the presence of a solvent such as acetic acid.

The alpha-gamma diketo ester of Formula IV may be prepared in a number of ways. Thus, for example, the diketo ester may be prepared by the condensation of a dialkyl oxalate, e.g., diethyl oxalate, with an acetophenone of the formula:

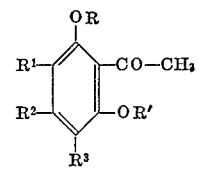

V in the presence of a condensation catalyst. Suitable condensation catalysts include for example alkali metal alkoxides, such as sodium ethoxide, sodamide, metallic sodium and sodium hydride; the condensation may be carried out in the presence of a solvent such as ethanol or dioxan.

The compound of Formula V may be prepared in a number of ways depending upon the exact nature of the substituents R, $R^1$, $R^2$ and $R^3$ and the availability of the various starting materials.

Thus compounds of Formula V may be prepared by acetylation of a phenol of the formula:

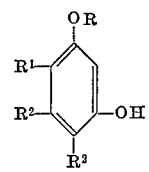

VI followed by Fries rearrangement to give the corresponding compound of Formula V.

The alpha-gamma diketo ester of Formula IV may also be prepared by the condensation of a pyruvate ester of the formula:

$$CH_3.CO.COOR''  \quad\quad (VII)$$

with a benzoic acid ester of the formula:

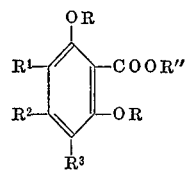

VIII in which R″ is an alkyl group, if desired in the presence of a condensation agent such as an alkali metal alkoxide, e.g., sodium ethoxide, sodamide, metallic sodium or sodium hydride, preferably in the presence of an organic solvent such as ethanol or dioxan.

The chromone-2-carboxylic acids obtained may be subsequently converted to their salts, esters or amides by well known methods. Thus, salts of the acids may be prepared by reaction of the acids with basic metal or ammonium compounds such as alkali metal or ammonium hydroxide or carbonates. Esters may be prepared by direct reaction of the acid with the requisite alcohol and amides by reaction of the acid with the corresponding amine. In general it is preferred to employ the acids in the form of salts, such as alkali metal salts, or amides, especially as complex amides with amino acids such as glycine. Such amides may be employed as such or as acid salts thereof.

In order that the invention may be well understood the following examples are given by way of illustration only. In the examples all parts and percentages are by weight unless otherwise stated.

Example 1.—5-(2-hydroxyethoxy)chromone-2-carboxylic acid 2,6-dihydroxyacetophenone (60.8 parts) was refluxed for 72 hours with 28 parts of anhydrous potassium carbonate and 50 parts of 2-bromoethanol in 250 parts of acetone. The liquid was filtered and the solvent evaporated. The residue was recrystallised from ether to obtain a first crop of 20 parts of 2-hydroxy-6-(2-hydroxyethoxy)acetophenone melting between 102 and 103° C.

Into a cooled and stirred suspension of sodium ethoxide (prepared from 9 parts of sodium and 25 parts of ethanol) in 300 parts toluene was run a solution of 20 parts of 2-hydroxy-6-(2-hydroxyethoxy)acetophenone in 75 parts of diethyl oxalate. The mixture was heated to 50° C. and stirred at this temperature for two hours. It was then diluted with ether and the precipitated solid was filtered, washed with ether and dried. It was then dissolved in water and acidified with dilute hydrochloric acid. The oily precipitate was extracted with chloroform and the extract was dried over sodium sulphate, filtered and evaporated to dryness, leaving an oil. This was dissolved in hot ethanol, treated with a little concentrated hydrochloric acid and boiled for ten minutes. The alcohol was then evaporated off and the residual solid was dissolved in chloroform, washed with saturated sodium bicarbonate solution and water, dried over sodium sulphate, filtered and evaporated to dryness to obtain 22 parts of solid melting between 129° and 132°. This was recrystallised from a mixture of benzene and petroleum spirit (B. 40–60°) to obtain 15.7 parts of ethyl 5-(2-hydroxyethoxy)chromone-2-carboxylate melting between 130 and 131°.

Analysis.—Found: C, 60.2; H, 5.10%. $C_{14}H_{14}O_6$ requires: C, 60.4; H, 5.04%.

When a solution of 6 parts of this ester in hot ethanol was treated with one equivalent of sodium hydroxide dissolved in ethanol a precipitate formed and the colour of the liquid turned pink. Sufficient water was added to dissolve the solid and the solution was decolorized with charcoal. Benzene was added to the filtered solution which was then evaporated to remove the water as an azeotrope. The colourless solid which precipitated was then filtered, washed with ether and dried to obtain 5.2 parts of sodium 5-(2-hydroxyethoxy)chromone-2-carboxylate.

A portion of this was dissolved in water and acidified with dilute hydrochloric acid. The precipitate was recrystallised from hot water to obtain 5-(2-hydroxyethoxy)chromone-2-carboxylic acid as colourless hair-like needles melting between 203° and 204°.

Analysis.—Found: C, 57.9; H, 4.19%. $C_{12}H_{10}O_6$ requires: C, 57.6; H, 4.04%.

Example 2.—5-(2-hydroxy propoxy)chromone-2-carboxylic acid

A solution of 5 parts, 2,6-dihydroxyacetophenone, 2 parts 1,2-epoxypropane and a catalytic amount (approximately 1%) of 40% aqueous benzyltrimethylammonium hydroxide in 10 parts dioxan was heated in a sealed vessel at 100° C. for 48 hours. The solvent was evaporated off in vacuo and the residue was dissolved in 50 parts of ether, boiled with charcoal, filtered and precipitated with petroleum spirit (B. 40–60° C.). The solid was recrystallised from a mixture of ether and petrol to yield 6 parts of 2-hydroxy-6-(2-hydroxypropoxy)acetophenone melting at 72° C.

Analysis.—Found: C, 62.4; H, 6.75%. $C_{11}H_{14}O_4$ requires. C, 62.8; H, 6.72%.

A solution of 2.1 parts of this compound in 10 parts of diethyl oxalate was reacted with sodium ethoxide from 1 part sodium and 5 parts ethanol in toluene, to yield 1.2 parts of ethyl 5-(2-hydroxypropoxy)chromone-2-carboxylate as pale yellow crystals melting between 133 and 134° C.

Analysis.—Found: C, 61.4; H, 5.55%. $C_{15}H_{16}O_6$ requires: C, 61.6; H, 5.53%.

A solution of the above ethyl ester was treated with hot ethanolic sodium hydroxide to yield sodium 5-(2-hydroxypropoxy)chromone-2-carboxylate monohydrate.

Analysis.—Found: C, 51.5; H, 4.5%. $C_{13}H_{11}NaO_6H_2O$ requires: C, 51.4; H, 4.28%.

Acidification of an aqueous solution of the above sodium salt yielded 5-(2-hydroxypropoxy)chromone-2-carboxylic acid as white crystals melting between 182 and 183° C.

Analysis.—Found: C, 58.7; H, 4.66%. $C_{13}H_{12}O_6$ requires: C, 59.1; H, 4.58%.

Example 3.—Ethyl-5-(2,3-dihydroxypropoxy)chromone-2-carboxylate 30.4 parts of 2,6-dihydroxyacetophenone, 13.8 parts of anhydrous potassium carbonate and 22 parts of 1-chloro-2,3-dihydroxypropane were refluxed together with stirring in 200 parts of dioxan for 48 hours. The liquid was filtered and evaporated in vacuo. The residue was extracted many times with boiling ether and the extract was concentrated and precipitated with petrol. The precipitate was recrystallised from ether to obtain 17.8 parts of 2-(2,3-dihydroxypropoxy)-6-hydroxyacetophenone melting between 88° and 90°. The melting point was raised to 98° by further crystallisation from ether.

Analysis.—Found: C, 57.9; H, 6.4%. $C_{11}H_{14}O_5$ requires: C, 58.4; H, 6.25%.

A solution of 4.2 parts of 2-(2,3-dihydroxypropoxyl)-6-hydroxy acetophenone in 10 parts of diethyl oxalate and 20 parts of ether was reacted with sodium ethoxide from 2 parts of sodium and 8 parts of ethanol as in the previous example to obtain 1.6 parts of ethyl 5-(2,3-dihydroxypropoxy)chromone - 2-carboxylate melting between 126° and 127°, from ether.

Analysis.—Found: C, 59.0; H, 5.4%. $C_{15}H_{16}O_3$ requires: C, 58.4; H, 5.2%.

A solution of 1 part of ethyl 5-(2,3-dihydroxypropoxy)chromone-2-carboxylate in 30 parts of boiling ethanol, when treated with an equivalent amount of ethanolic sodium hydroxide, gave 0.65 parts of sodium 5-(2,3-dihydroxypropoxy)chromone-2-carboxylate, after concentration and addition of ether.

Example 4.—5-(2-hydroxypropoxy)-7-methyl-chromone-2-carboxylic acid

A mixture of 7 parts of 2,6-dihydroxy-4-methylacetophenone, 15 parts of dioxan, 2.44 parts of propylene oxide and 0.15 parts of benzyltrimethylammonium hydroxide was heated in a sealed container, at 100° C., for 3 days.

On cooling, 2.5 parts of 2-hydroxy-6-(2-hydroxypropoxy)-4-methylacetophenone crystallised out as yellow needles, melting point 110° C. A further 2.54 parts of product were obtained on dilution of the filtrate with water.

*Analysis.*—Found: C, 63.9; H, 7.04%. $C_{12}H_{16}O_4$ requires: C, 64.3; H, 7.17%.

To a stirred, ice-cold, solution of sodium ethoxide in ethanol, prepared from 1.84 parts of sodium and 16 parts of ethanol, was added a mixture of 7.2 parts of diethyl oxalate and 4.52 parts of 2-hydroxy-6-(2-hydroxypropoxy)-4-methylacetophenone in 20 parts of diethyl ether. The mixture was stirred and heated under gentle reflux for 4 hours.

After cooling, diethyl ether and water were added, the aqueous layer was separated, acidified with dilute hydrochloric acid and extracted with chloroform. The chloroform solution was dried over sodium sulphate, filtered and evaporated to leave a red oil.

This oil was dissolved in 20 parts of boiling ethanol and 0.2 parts of concentrated hydrochloric acid was added. The solution was boiled for 10 minutes, and the ethanol was distilled off to leave ethyl 5-(2-hydroxypropoxy)-7-methylchromone-2-carboxylate as a liquid.

Ethyl 5-(2-hydroxypropoxy)-7-methylchromone-2-carboxylate was heated on the steam bath with excess of sodium bicarbonate solution until all the oil had dissolved. The solution was then charcoaled and acidified with dilute hydrochloric acid to yield 2.52 parts of 5-(2-hydroxypropoxy) - 7 - methylchromone - 2-carboxylic acid as yellow needles, melting point 210–212° C. with decomposition.

*Analysis.*—Found: C, 60.9; H, 4.83%. $C_{14}H_{14}O_6$ requires: C, 60.4; H, 5.07%.

A mixture of 1.78 parts of 5-(2-hydroxypropoxy)-7-methylchromone-2-carboxylic acid and 0.53 parts of sodium bicarbonate was dissolved in 20 parts of water. The solution was charcoaled and then freeze-dried to give 1.86 parts of sodium 5 - (2 - hydroxypropoxy) - 7-methyl-chromone-2-carboxylate as a buff-coloured solid.

Example 5.—5-(2-hydroxyethoxy)-7-methyl-chromone-2-carboxylic acid

A mixture of 7 parts of 2,6-dihydroxy-4-methylacetophenone and 1.85 parts of ethylene oxide was condensed, following the procedure of Example 4, to give 5.72 parts of 2 - hydroxy - 6 - (2 - hydroxyethoxy) - 4 - methylacetophenone, melting point 114–116° C.

*Analysis.*—Found: C, 62.8; H, 6.77%. $C_{11}H_{14}O_4$ requires: C, 62.84; H, 6.71%.

To a stirred solution of sodium ethoxide in ethanol, prepared from 2.45 parts of sodium and 20 parts of ethanol, was added a mixture of 5.59 parts of 2-hydroxy-6-(2-hydroxyethoxy)-4-methylacetophenone and 9.1 parts of diethyl oxalate in 25 parts of diethyl ether, using the same conditions as in Example 4, to give 4.4 parts of a yellow solid.

One part of this solid was hydrolysed with sodium bicarbonate solution, as in Example 4, to give 0.8 part of 5-(2-hydroxyethoxy)-7-methylchromone-2-carboxylic acid, metling point 205–6° C.

*Analysis.*—Found: C, 58.8; H, 4.64%. $C_{13}H_{12}O_6$ requires: C, 59.09; H, 4.58%.

The sodium salt was prepared by the method of Example 4, using 0.72 part of 5-(2-hydrethoxy)-7-methylchromone-2-carboxylic acid and 0.23 parts of sodium bicarbonate to give 0.67 part of sodium 5-(2-hydroxyethoxy)-7-methylchromone-2-carboxylate.

Example 6.—6,8-dichloro-5-(2-hydroxyethoxy)-7-methylchromone-2-carboxylic acid

To a solution of 6.16 parts of 2,6-dihydroxy-4-methylacetophenone in 50 parts of diethyl ether was added a solution of 10.8 parts of sulphuryl chloride in 10 parts of diethyl ether. A yellow solid separated immediately. The mixture was left at room temperature for one hour, filtered, washed with diethyl ether and dried to give 6.22 parts of 3,5-dichloro-2,6-dihydroxy-4-methylacetophenone as yellow needles, melting point 164–5° C.

*Analysis.*—Found: C, 46.7; H, 3.43%. $C_9H_8Cl_2O_3$ requires: C, 46.0; H, 3.44%.

A mixture of 6.52 parts of 3,5-dichloro-2,6-dihydroxy-4-methylacetophenone and 1.2 parts of ethylene oxide was condensed by the method of Example 4 to give 1.35 of 3,5 - dichloro - 2 - hydroxy-6(2-hydroxyethoxy(-4-methylacetophenone, melting point 111–2° C.

*Analysis.*—Found: C, 47.2; H, 3.9%. $C_{11}H_{12}Cl_2O_4$ requires: C, 47.5; H, 4.3%.

4.1 parts of 3,5-dichloro-2,6-dihydroxy-4-methylacetophenone were recovered.

To a stirred solution of sodium ethoxide in ethanol, prepared from 1.02 parts of sodium and 10 parts of ethanol was added a mixture of 3.1 parts of 3,5-dichloro-2-hydroxy-6-(2-hydroxyethoxy)-4-methylacetophenone and 3.75 parts of diethyl oxalate in 15 parts of diethyl ether, using the same conditions as in Example 4 up to the removal of the chloroform. The oil left at this stage was dissolved in ethanol and heated under reflux for 5 minutes in the presence of 0.2 part of concentrated hydrochloric acid. On cooling water was added to give an oil which on trituration with benzene gave a yellow solid. The solid was dissolved in sodium bicarbonate solution which was then acidified to give 0.41 part of 6,8-dichloro-5- (2-hydroxyethoxy)- 7-methylchromone- 2-carboxylic acid as a buff-coloured solid, melting point 193–5° C.

*Analysis.*—Found: C, 46.8; H, 3.02%. $C_{13}H_{10}Cl_2O_6$ requires: C, 47.0; H, 3.01%.

The benzene, from the trituration stage, was evaporated off and the resulting oil crystallized from light petroleum (boiling range 60–80° C.) to give ethyl 6,8-dichloro-5-(2-hydroxyethoxy)-7-methylchromone-2-carboxylate as yellow prisms, melting point 109–112° C.

*Analysis.*—Found: C, 50.1; H, 3.7%. $C_{15}H_{14}Cl_2O_6$ requires: C, 50.0; H, 3.88%.

The sodium salt was prepared by the procedure of Example 4, giving 0.33 part of 6,8-dichloro-5-(2-hydroxyethoxy)-7-methylchromone-2-carboxylic acid.

Example 7.—5,7-bis(2-ethoxyethoxy)-chromone-2-carboxylic acid

A mixture of 22 parts of 2,4,6-trihydroxyacetophenone, 22 parts of 2-ethoxyethyl bromide, 13.5 parts of potassium carbonate, 1 part of potassium iodide and 100 parts of dimethyl formamide were heated at 100° C. with stirring for 72 hours. The mixture was cooled and poured into 500 parts of water. The solution was acidified and extracted with chloroform. The chloroform solution was thoroughly extracted with 10% sodium carbonate solution, washed with water, dried over potassium carbonate, filtered, and the solvent was removed to leave an oil. Sodium carbonate solution was added to this and the mixture was extracted with light petroleum (boiling range 60–80° C.) The petroleum solution was washed with water, dried over potassium carbonate, filtered and the solvent was removed to leave 10.8 parts of 2,4-bis(2-ethoxyethoxy)-6-hydroxyacetophenone, melting point 44–46° C.

*Analysis.*—Found: C, 61.7; H, 7.80%. $C_{16}H_{24}O_6$ requires: C, 61.5; H, 7.76%.

A mixture of 5 parts of 2,4-bis(2-ethoxyethoxy)-6-hydroxyacetophenone in 33 parts of warm diethyl oxalate was run into a solution of 3.5 parts of sodium in 40 parts of ethanol. The mixture was heated under reflux on the steam bath for 30 minutes, cooled, acidified with aqueous acetic acid and extracted with chloroform. The chloroform solution was washed with 10% sodium bicarbonate solution, water, and dried over sodium sulphate. After filtration and removal of the solvent the residual oil was dissolved in 16 parts of ethanol, and 0.3 part of concentrated hydrochloric acid was added. The solution was heated on the steam bath for 10 minutes and filtered. The crude product which separated was recrystallized from light petroleum (boiling range 60–80° C.), to give 2 parts of ethyl 5,7-bis(2-ethoxyethoxy)chromone-2-carboxylate, melting point 89–91° C.

Analysis.—Found: C, 60.5; H, 6.52%. $C_{20}H_{26}O_8$ requires: C, 60.9; H, 6.64%.

A mixture of 1.5 parts of ethyl 5,7-bis(2-ethoxyethoxy)chromone-2-carboxylate, 4 parts of sodium bicarbonate and 60 parts of water was heated on the steam bath for 2 hours, cooled, and acidified with dilute hydrochloric acid. The precipitated product was filtered off, washed acid free, dried, and crystallised from ethanol, to give 0.75 part of 5,7-bis(2-ethoxyethoxy)chromone-2-carboxylic acid, melting point 146.5–147.5° C.

Analysis.—Found: C, 58.4; H, 5.89%. $C_{18}H_{22}O_8$ requires: C, 59.0; H, 6.06%.

A solution of 0.5 part of 5,7-bis(2-ethoxyethoxy)chromone-2-carboxylic acid in water containing 0.114 part of sodium bicarbonate was freeze-dried to give sodium 5,7-bis(2-ethoxyethoxy)chromone-2-carboxylate.

Example 8.—5-(2-acetoxyethoxy)chromone-2-carboxylic acid

A portion of 5-(2-hydroxyethoxy)chromone-2-carboxylic acid prepared as in Example 1 was heated with excess acetic anhydride containing a catalytic amount of concentrated sulphuric acid. After cooling, the liquid was poured onto ice and the mixture was extracted with chloroform. The chloroform was evaporated to dryness and the solid was recrystallised from a mixture of ethyl acetate and petroleum spirit (B. 40–60° C.) to obtain 5-(2-acetoxyethoxy)chromone-2-carboxylic acid melting between 166 and 167° C.

Analysis.—Found: C, 57.4; H, 4.02%. $C_{14}H_{12}O_7$ requires: C, 57.5; H, 4.14%.

A suspension of 2 parts of this acid in water was stirred with 0.575 part of sodium bicarbonate, filtered and freeze-dried to obtain 2.2 parts of sodium 5-(2-acetoxyethoxy)chromone-2-carboxylate.

Analysis.—Found: C, 57.3; H, 4.23%. $C_{14}H_{11}NaO_7$ requires: C, 57.5; H, 4.11%.

Example 9.—5-(2-carbamoyloxyethoxy)chromone-2-carboxylic acid

To a solution of 1.39 parts of ethyl 5-(2-hydroxyethoxy)chromone-2-carboxylate from Example 1 in 15 parts of chloroform was added 3.3 parts of a solution of phosgene in toluene followed by a solution of 0.61 part of dimethylaniline in 5 parts chloroform. The mixture was kept at room temperature for 2 hours and then heated at 40° C. for 1 hour. It was washed twice with water and then shaken with 10 parts concentrated aqueous ammonia for 1 hour and stood for 16 hours. The precipitated solid was filtered and recrystallised twice from aqueous ethanol to obtain 5 - (2-carbamoyloxyethoxy)chromone - 2-carboxyamide as white crystals melting between 230 and 231° C.

Analysis.—Found: C, 52.9; H, 4.27; N, 9.1%. $C_{13}H_{12}N_2O_6$ requires: C, 53.4; H, 4.10; N, 9.6%.

A suspension of 1 part of the above amide in 30 parts of water containing 3 parts sodium bicarbonate was heated for 45 minutes on a steam bath. The solution was cooled, filtered and acidified with dilute hydrochloric acid. The precipitate was recrystallised twice from water to obtain 0.3 parts of 5-(2-carbamoyloxyethoxy)chromone-2-carboxylic acid as white crystals melting between 195 and 197° C.

Analysis.—Found: C, 53.3; H, 3.8; N, 4.9%. $C_{13}H_{11}NO_7$ requires: C, 53.2; H, 3.8; N, 4.8%.

A suspension of 1 part of the above acid was stirred with an aqueous solution of an equivalent amount of sodium bicarbonate until it had dissolved. The solution was filtered and freeze-dried to obtain 1 part of sodium 5 - (2-carbamoyloxyethoxy)chromone-2-carboxylate.

Example 10.—Ethyl 5-(2-isobutyryloxyethoxy)chromone-2-carboxylate

A solution of 1.39 parts of ethyl 5-(2-hydroxyethoxy)chromone-2-carboxylate from Example 1, 1.1 parts of isobutyrylchloride and 0.8 part of pyridine in 25 parts chloroform was refluxed for 16 hours. The mixture was cooled, washed with water and with sodium carbonate solution, dried over sodium sulphate and evaporated to obtain a gum. This was crystallised twice from petroleum spirit (B. 60–80° C.) to obtain 0.9 part of ethyl 5-(2-isobutyryloxyethoxy)chromone-2-carboxylate as yellow crystals melting between 67.5 and 68° C.

Analysis.—Found: C, 62.3; H, 5.81%. $C_{18}H_{20}O_7$ requires: C, 62.1; H, 5.79%.

The above ester was subsequently converted to the sodium salt by treatment with ethanolic sodium hydroxide.

Example 11.—5-diethyl(1',4'-dioxa-5'-oxoheptyl)chromone-2,7'-dicarboxylate

By the method of Example 10, 2.8 parts of ethyl 5-(2-hydroxyethoxy)chromone-2-carboxylate from Example 1 were reacted with 1.65 parts ethyl succinyl chloride to obtain 1 part diethyl 5-(1',4'-dioxa-5'-oxo-heptyl)chromone-2,7'-dicarboxylate melting between 75 and 77° C. from petroleum spirit (B. 60–80° C.).

Analysis.—Found: C, 59.4; H, 5.48%. $C_{20}H_{22}O_9$ requires: C, 59.1; H, 5.46%.

Example 12.—5-(1',4'-dioxa-5'-oxoheptyl)chromone-2,7'-dicarboxylic acid

A mixture of 1 part of ethyl 5-(2-hydroxyethoxy)chromone-2-carboxylate from Example 1, 0.4 part succinic anhydride and 5 parts pyridine was heated at 40° C. for 16 hours, poured on to ice, acidified wih dilute hydrochloric acid and the precipitate was filtered off. It was then dissolved in aqueous sodium bicarbonate solution by warming on a steam bath, treated with charcoal, filtered, cooled and acidified. On standing crystals formed slowly. These were filtered and recrystallised from water to obtain 0.6 part 5-(1',4'-dioxa-5'-oxoheptyl)chromone-2,7'-dicarboxylic acid melting between 192 and 194° C.

Analysis.—Found: C, 54.5; H, 4.1; equiv. wt. 189.8. $C_{16}H_{14}O_9$ requires: C, 54.9; H, 4.0; equiv. wt. 189.

Example 13.—Ethyl 5-(3-hydroxypropoxy)chromone-2-carboxylate

A mixture of 10 parts 2,6-dihydroxyacetophenone, 6 parts 3-chloropropanol and 5 parts potassium carbonate in 50 parts dioxan was refluxed for 3 days, filtered and evaporated. The oil on standing gave low melting crystals. These were isolated and, without further purification, 4.2 parts were dissolved in 50 parts diethyl oxalate plus 50 parts ether, and run into a stirred solution of 1.5 parts sodium in 30 parts ethanol. The mixture was heated gently for 4 hours, diluted with ether and the solid was filtered, washed with ether and dried. It was dissolved in water and acidified to obtain an oil. This was extracted with chloroform, dried and evaporated. The resultant oil was boiled with ethanol with a catalytic amount of hydrochloric acid, and evaporated. The oil was extracted into ether, concentrated and diluted with petrol to obtain 1.3 parts of a sticky solid. This was recrystallised from ethyl acetate to obtain 0.8 part of ethyl 5-(3-hydroxypropoxy)chromone-2-carboxylate melting between 143 and 145° C.

Analysis.—Found: C, 61.7; H, 5.48%. $C_{15}H_{16}O_6$ requires: C, 61.6; H, 5.48%.

On treatment with ethanolic sodium hydroxide, 0.6 part of the above ethyl ester gave 0.47 part of sodium 5-(3-hydroxypropoxy)chromone-2-carboxylate.

Example 14.—5-(2-ethoxyethoxy)chrome-2-carboxylic acid

A mixture of 15.2 parts 2,6-dihydroxyacetophenone, 11.4 parts bromodiethyl ether and 7 parts potassium carbonate was refluxed in 100 parts acetone for 24 hours. The liquid was filtered and evaporated to obtain an oil. This was extracted with petroleum spirit (B. 40–60° C.) and from the extract were obtained 4.4 parts crystals melting at 42° C. Without further purification these were dissolved in 15 parts diethyl oxalate and reacted with 1.5 parts sodium dissolved in ethanol as in Example 1, to obtain 3.8 parts of ethyl 5-(2-ethoxyethoxy)chromone-2-carboxylate melting between 62 and 63° C. from ether plus petrol.

*Analysis.*—Found: C, 62.4; H, 6.09%. $C_{16}H_{18}O_6$ requires: C, 62.7; H, 5.92%.

A solution of 1.5 parts of the above ethyl ester was treated with ethanolic sodium hydroxide to give 1.25 parts of the sodium salt.

An aqueous solution of the sodium salt was acidified and the precipitate recrystallised from water to give 5-(2-ethoxyethoxy)chromone-2-carboxylic acid melting between 165.5° and 166° C.

*Analysis.*—Found: C, 60.0; H, 5.0%. $C_{14}H_{14}O_6$ requires: C, 59.6; H, 5.0%.

Example 15.—Ethyl 5-(2-hydroxybutoxy)chromone-2-carboxylate 2,6-dihydroxyacetophenone (6 parts) was reacted with 1.7 parts 1,2-epoxybutane as in Example 2 to obtain 8 parts of crude 2-hydroxy-6-(2-hydroxybutoxy)acetophenone. This was recrystallised from petroleum spirit to obtain the pure ether melting between 66 and 67° C.

*Analysis.*—Found: C, 64.3; H, 7.1%. $C_{12}H_{16}O_4$ requires: C, 64.3; H, 7.2%.

A solution of 6.6 parts of this product in 30 parts of diethyl oxalate and 60 parts of ether was reacted with a solution of 2.3 parts of sodium in ethanol to yield ethyl 5-(2-hydroxybutoxy)chromone-2-carboxylate, M.P. 88–89° C.

*Analysis.*—Found: C, 62.6; H, 5.8%. $C_{16}H_{18}O_6$ requires: C, 62.7; H, 5.9%.

The acid was converted to the sodium salt by treatment with aqueous sodium bicarbonate.

Example 16.—5-(2-acetoxypropoxy)chromone-2-carboxylic acid

A mixture of 2.3 parts of 5-(2-hydroxypropoxy) chromone-2-carboxylic acid, 15 parts acetic anhydride and 0.1 part sulphuric acid was heated at 100° C. for 3 hours. The mixture was poured on to ice, left for 4 hours and filtered. The solid was recrystallised from ethyl acetate to obtain 1 part of 5-(2-acetoxypropoxy)chromone-2-carboxylate melting between 199 and 200° C., which was raised to 202 to 203° C. by reprecipitation from aqueous sodium bicarbonate solution.

*Analysis.*—Found: C, 58.3; H, 4.6%. $C_{14}H_{14}O_7$ requires: C, 58.8; H, 4.6%.

The acid was converted to the sodium salt by treatment with aqueous sodium bicarbonate.

Example 17.—5-(2-hydroxy-3-methoxypropoxy) chromone-2-carboxylic acid 2,6-dihydroxyacetophenone (15 parts) was reacted with 1-chloro-2-hydroxy-3-methoxypropane as in Example 1 and the condensation product was partially purified by distillation between 160 and 175° C. at 0.7 mm. Hg pressure. Without further purification 10 parts of this were reacted with diethyl oxalate and sodium ethoxide as in Example 1. The ethyl ester was obtained as a solid melting between 61 and 63° C. Without further purification it was hydrolysed by heating with an excess of sodium bicarbonate in water until all had dissolved, treating with charcoal, cooling and acidifying. The solid melting between 160 and 162° C. was purified by recrystallisation from isopropanol plus petroleum spirit (B. 60 to 80° C.) to obtain 5-(2-hydroxy-3-methoxypropoxy)chromone-2-carboxylic acid melting between 171 and 173° C.

*Analysis.*—Found: C, 57.1; H, 4.7%. $C_{14}H_{14}O_7$ requires: C, 57.1; H, 4.8%

The acid was converted to the sodium salt by treatment with aqueous sodium bicarbonate.

Example 18.—Ethyl 5-(2-[ethoxyethoxy]ethoxy) chromone-2-carboxylate 2,6-dihydroxyacetophenone (4.6 parts) was reacted with 6 parts 2-(2-ethoxyethoxy)ethyl bromide as in Example 1. The product was an oil which distilled between 140 and 149° C. at 0.15 mm. Hg pressure. A solution of 5 parts of this oil in 15 parts diethyl oxalate was reacted with 1.5 parts sodium in ethanol plus ether as in Example 2 to obtain 2.4 parts ethyl 5-(2-[2-ethoxyethoxy]ethoxy) chromone-2-carboxylate melting between 71 and 72° C. from petroleum spirit (B. 60 to 80° C.).

*Analysis.*—Found: C, 61.8; H, 6.30%. $C_{18}H_{22}O_7$ requires: C, 61.7; H, 6.33%.

The ester was converted to the sodium salt by treatment with ethanolic sodium hydroxide.

Example 19.—5-(tetrahydrofur-2-ylmethoxy) chromone-2-carboxylic acid 2,6-dihydroxyacetophenone (8 parts) was converted to the monosodium salt and reacted with 9.15 parts of tetrahydrofur-2-ylmethyl-methanesulphonate in 100 parts of boiling n-butanol for 24 hours. The liquid was cooled and washed in turn with water, dilute sodium carbonate and water. The combined aqueous layers were washed with ether and the ether layer combined with the butanol layer and distilled to obtain 5.5 parts of impure 2-hydroxy-6-(tetrahydrofur-2-ylmethoxy)-acetophenone boiling between 118 and 138° C. at 0.002 mm. Hg pressure. Without further purification this was dissolved in 10 parts diethyl oxalate and reacted with 1.6 parts sodium in ethanol as in Example 1 to obtain 3 parts of ethyl 5-(tetrahydrofur-2-ylmethoxy)chromone-2-carboxylate as orange plates melting between 96 and 96.5° C., after chromatography on alumina and recrystallisation from petroleum spirit (B. 60 to 80° C.).

*Analysis.*—Found: 63.9; H, 5.60%. $C_{17}H_{18}O_6$ requires: C, 64.1; H, 5.70%.

The ester was hydrolysed by heating with aqueous sodium bicarbonate until dissolved. On acidification a solid was obtained which was recrystallised from benzene plus ethanol to obtain 5-(tetrahydrofur-2-ylmethoxy) chromone-2-carboxylic acid, melting betwen 183 and 185° C.

*Analysis.*—Found: C, 61.5; H, 4.66%. $C_{15}H_{14}O_6$ requires: C, 62.1; H, 4.86%.

The acid was converted to the sodium salt by treatment with aqueous sodium bicarbonate.

Example 20.—5-(1,3 - dioxan - 4 - ylmethoxy)chromone-2-carboxylic acid 2,6-dihydroxyacetophenone monosodium salt (8 parts) was reacted with 6.9 parts of 4-chloromethyl-1,3-dioxane as in Example 19 to obtain 2.1 parts of impure monoether boiling between 180 and 194° C. at 1 mm. Hg pressure. Without further purification this was reacted with 3.7 parts diethyl oxalate and 0.57 part sodium in ethanol as in Example 19 to obtain 0.4 part ethyl 5-(1,3-dioxan-4-ylmethoxy)chromone-2-carboxylate melting between 143 and 143.5° C. from benzene plus petrol.

*Analysis.*—Found: C, 61.8; H, 5.34%. $C_{17}H_{18}O_7$ requires: C, 61.6; H, 5.43%.

The ester was hydrolysed by the method of Example 20 to obtain 5 - (1,3-dioxan-4-ylmethoxy)chromone-2-carboxylic acid melting between 221 and 222° C. from benzene plus ethanol.

*Analysis.*—Found: C, 58.9; H, 4.30%. $C_{15}H_{14}O_7$ requires: C, 58.8; H, 4.61%.

The acid was converted to the sodium salt by treatment with aqueous sodium bicarbonate.

Example 21.—5-(2-[ethoxymethoxy]ethoxy) chromone-2-carboxylic acid

A mixture of 1 part of ethyl 5 - (2-hydroxyethoxy) chromone-2-carboxylate, 1 part chloromethyl ethyl ether, and 0.45 part dimethylaniline was refluxed in 10 parts benzene for 30 minutes, cooled and washed with water. The benzene layer was dried over sodium sulphate and evaporated to dryness yielding an oil which solidified on scratching in petrol. This was recrystallised from petrol to obtain ethyl 5 - (2 - [ethoxy-methoxy]ethoxy) chromone-2-carboxylate melting between 68.5 and 70.5° C.

Analysis.—Found: C, 61.2; H, 6.03%. $C_{17}H_{20}O_7$ requires: C, 60.7; H, 5.99%.

The ester was hydrolysed by the method of Example 20 to obtain 5-(2-ethoxymethoxy ethoxy)chromone - 2-carboxylic acid melting between 207 and 208° C. from water.

Analysis.—Found: C, 57.8; H, 4.22%. $C_{15}H_{16}O_7$ requires: C, 58.4; H, 4.23%.

The acid was converted to the sodium salt by treatment with aqueous sodium bicarbonate.

Example 22.—4 - (2 - ethoxyethoxy)-9-methoxy-5-oxo-5H-furo[3,2-g][1]benzopyran-7-carboxylic acid A mixture of 12.3 parts of 4-hydroxy-9-methoxy-7-methyl-5-oxo-5H-furo [3,2-g][1]benzopyran (desmethylkhellin), 9.18 parts of 2-ethoxyethyl bromide and 3.45 parts of potassium carbonate, in 60 parts of dimethylformamide, was heated at 100° C. for three days. The solution was cooled and 100 parts of water was added. The precipitated solid (3.77 parts), was identified as the starting material, desmethylkhellin, M.P. 198° C.

On allowing the mother liquors to stand a precipitate was obtained which was crystallised from diethyl ether-light petroleum (B. range 40–60° C.) to give 4.6, parts of 4-(2-ethoxyethoxy)-9-methoxy-7-methyl-5-oxo-5H-furo [3.2-g][1]benzopyran as yellow needles, M.P. 95–6° C.

Analysis.—Found: C, 64.4; H, 5.9%. $C_{17}H_{18}O_6$ requires: C, 64.14; H, 5.7%.

A mixture of 12.45 parts of 4-(2-ethoxyethoxy) - 9-methoxy-7-methyl-5-oxo-5H - furo[3,2 - g][1]benzopyran and 12 parts of potassium hydroxide in 120 parts of water was heated under reflux for ½ hour. The solution was cooled, filtered, cooled to below 5° C. and acidified with dilute acetic acid. The resulting brown precipitate was extracted into chloroform and the chloroform solution was dried over sodium sulphate, treated with charcoal, filtered and evaporated to leave a red oil. This oil was crystallised from diethyl ether-light petroleum (B. range 40–60° C.) to give 7.0 parts of 5-acetyl-4-(2-ethoxyethoxy) - 6 - hydroxy-7-methoxybenzo[b]furan as yellow needles, M.P. 58–60° C.

Analysis.—Found: C, 61.1; H, 6.15%. $C_{15}H_{18}O_6$ requires: C, 61.21; H, 6.17%.

To a stirred ice-cold solution of sodium ethoxide in ethanol, prepared from 1.65 parts of sodium and 16 parts of ethanol, was added a mixture of 4.4 parts of diethyl oxalate and 2.4 parts of 5-acetyl-4-(2-ethoxyethoxy)-6-hydroxy-7-methoxybenzo[b]furan, in 20 parts of diethyl ether. The mixture was stirred and heated under gentle reflux for 4 hours.

After cooling, diethyl ether and water were added, the aqueous layer was separated, acidified with dilute hydrochloric acid and extracted with chloroform. The chloroform solution was dried over sodium sulphate, filtered and evaporated to leave an orange solid. The solid was dissolved in 20 parts of boiling ethanol and 0.2 part of concentrated hydrochloric acid was added. The solution was boiled for 10 minutes and on cooling gave 0.9 part of 4-(2-ethoxyethoxy)-9-methoxy-5 - oxo - 5H - furo[3,2-g][1] benzopyran-7-carboxylic acid as yellow needles, M.P. 217° C.

Analysis.—Found: C, 58.2; H, 4.81%. $C_{17}H_{16}O_8$ requires: C, 58.6; H, 4.63%.

The ethyl ester of 4-(2-ethoxyethoxy)-9-methoxy-5-oxo-5H-furo[3,2-g.][1]benzopyran-7-carboxylic acid may also be obtained using the same conditions and on crystallisation from diethyl ether-light petroleum (B. range 40–60° C.) gives yellow needles, M.P. 79° C.

Analysis.—Found: C, 60.8; H, 5.36%. $C_{19}H_{20}O_8$ requires: C, 60.6; H, 5.36%.

The ester may be hydrolysed to the acid.

A mixture of 0.74 parts of 4-(2-ethoxyethoxy)-9-methoxy-5-oxo-5H-furo[3,2-g.][1]benzopyran - 7-carboxylic acid, and 0.175 parts of sodium bicarbonate was dissolved in 20 parts of water and freeze-dried to give 0.7 part of sodium 4 - (2-ethoxyethoxy)-9-methoxy-5-oxo-5H - furo [3,2-g.][1]benzopyran-7-carboxylate as a pale yellow solid.

Example 23.—5-carboxymethoxychromone-2-carboxylic acid

To a solution of 5.0 parts of 2,6-dihydroxyacetophenone and 3.25 parts of sodium hydroxide in 10 parts water was added a solution of 3.5 parts of chloroacetic acid in 3.5 parts of water. The mixture was heated at 100° C. for 25 minutes. It was then cooled and acidified with concentrated hydrochloric acid, with stirring. A solid was precipitated which was filtered off and extracted with 4 lots of 20 parts of saturated sodium bicarbonate solution. Acidification of the alkaline solution with concentrated hydrochloric acid gave a solid which was crystallised from water to give 3.0 parts of 2-acetyl-3-hydroxyphenoxyacetic acid, melting point 195–198°.

Analysis.—Found: C, 57.1; H, 4.73%. $C_{10}H_{10}O_5$ requires: C, 57.1; H, 4.8%.

A slurry of 16.5 parts of 2-acetyl-3-hydroxyphenoxyacetic acid in 30 parts of diethyl oxalate was added to a stirred solution of 22 parts of sodium ethoxide in 70 parts of diethyl ether and the mixture was stirred at 20° for 16 hours. The mixture was then diluted with 140 parts of diethyl ether and extracted with 3 lots of 250 parts of water. The aqueous extract was washed with 70 parts of ether and then acidified with concentrated hydrochloric acid and extracted with 4 lots of 150 parts of chloroform. The chloroform was distilled and the residual red oil was heated for 4 hours with 30 parts of glacial acetic acid and 10 parts of concentrated hydrochloric acid. The solvent was then distilled and the residue was poured into 120 parts of water with stirring to give a solid, which was dissolved in sodium bicarbonate solution. The solution was filtered, and the solid was reprecipitated with dilute hydrochloric acid to give 10 parts of carboxymethoxychromone-2-carboxylic acid, melting point 265° (d.).

Analysis.—Found: C, 54.8; H, 3.13%. $C_{12}H_8O$ requires: C, 54.6; H, 3.05%.

2.0 parts of 5-carboxymethoxychromone - 2 - carboxylic acid was dissolved in a solution of 1.25 parts of sodium bicarbonate in 25 parts of water, and the solution was "freeze-dried" to give 2.3 parts of the disodium salt of 5-carboxymethoxychromone-2-carboxylic acid.

Example 24.—5-(2-ethoxyethoxy)-8-ethylchromone-2-carboxylic acid (a) 6-(2-ethoxyethoxy) - 3 - ethyl-2-hydroxyacetophenone.—A mixture of 18 parts of 2,6-dihydroxy-3-ethylacetophenone, 15.3 parts of 2-ethoxyethyl bromide and 13.8 parts of anhydrous potassium carbonate in 80 parts of dimethylformamide was heated at 100° C. for 24 hours. The mixture was then poured into water, acidified with dilute hydrochloric acid and extracted with diethyl ether. The ethereal solution was dried over sodium sulphate, filtered and evaporated to leave a red oil.

This oil was distilled to give 12.2 parts of 6-(2-ethoxyethoxy)-3-ethyl-2-hydroxyacetophenone as a pale yellow oil, boiling point 142° C. at 0.15 mms.

Analysis.—Found: C, 66.7; H, 7.74%. $C_{14}H_{20}O_4$ requires: C, 66.64; H, 7.99%.

(b) *Ethyl 5-(2-ethoxyethoxy) - 8 - ethylchromone-2-carboxylate.*—To a stirred, ice-cooled, solution of sodium ethoxide in ethanol, prepared from 2.3 parts of sodium and 30 parts of ethanol, was added a mixture of 7.7 parts of diethyl oxalate and 5.15 parts of 6-(2-ethoxyethoxy)-3-ethyl-2-hydroxyacetophenone in 60 parts of diethyl ether. The mixture was stirred and heated under gentle reflux for 4 hours.

After cooling, diethyl ether and water were added, the aqueous layer was separated, acidified with dilute hydrochloric acid and extracted with chloroform. The chloroform solution was dried over sodium sulphate, filtered and evaporated to leave an oil.

This oil was dissolved in 20 parts of boiling ethanol and 0.2 part of concentrated hydrochloric acid was added. The solution was boiled for 10 minutes and the ethanol was distilled off to leave a yellow oil which was crystallised from diethyl ether to give 3.8 parts of ethyl 5-(2-ethoxyethoxy)-8-ethylchromone-2-carboxylate as pale yellow needles, melting point 77° C.

*Analysis.*—Found: C, 64.5; H, 6.73%. $C_{18}H_{22}O_6$ requires: C, 64.65; H, 6.63%.

(c) *5-(2-ethoxyethoxy)-8-ethylchromone - 2 - carboxylic acid.*—A solution of 0.7 part of ethyl 5-(2-ethoxyethoxy)-8-ethylchromone-2-carboxylate in 10 parts of ethanol was treated with a solution of 0.08 part of sodium hydroxide in 20 parts of ethanol. The mixture was refluxed for 7 minutes, then cooled.

Diethyl ether and water were added and the aqueous phase was separated and acidified with dilute hydrochloric acid to give a buff coloured precipitate. This solid was crystallised from ethanol to give 0.6 part of 5-(2-ethoxyethoxy)-8-ethylchromone-2-carboxylic acid, hemihydrate as pale yellow needles, melting point 142–3° C.

*Analysis.*—Found: C, 61.1; H, 5.96%. $C_{16}H_{18}O_6 \cdot \tfrac{1}{2}H_2O$ requires: C, 61.0; H, 6.0%.

(d) *Sodium 5-(2-ethoxyethoxy)-8-ethylchromone-2-carboxylate.*—A solution of 0.55 part of 5-(2-ethoxyethoxy)-8-ethylchromone-2-carboxylic acid and 0.15 parts of sodium carbonate in 20 parts of water was freeze-dried to give 0.42 part of sodium 5-(2-ethoxyethoxy)-8-ethylchromone-2-carboxylate as a pale brown solid.

Example 25.—5-(2-hydroxypropyl)-7-methoxychromone-2-carboxylic acid (a) *6-hydroxy-2-(2-hydroxypropoxy)-4-methoxyacetophenone.*—A mixture of 7.0 parts of 2,6-dihydroxy-4-methoxyacetophenone, 3 parts of propylene oxide and 0.3 part of benzyl trimethyl ammonium hydroxide in 20 parts of dioxan was heated in a sealed vessel at 100° C. for 48 hours.

The resulting solution was evaporated to dryness to leave a brown oil which was extracted with diethyl ether. The diethyl ether was evaporated off to leave a yellow oil which solidified on cooling. This solid was crystallised from ethanol to give 2.9 parts of 6-hydroxy-2-(2-hydroxypropoxy)-4-methoxyacetophenone as pale yellow needles melting point 98–100° C.

*Analysis.*—Found: C, 59.0; H, 6.4%. $C_{12}H_{16}O_5$ requires: C, 60.0; H, 6.71%.

(b) *Ethyl 5-(2-hydroxypropoxy)-7-methoxychromone-2-carboxylate.*—To a stirred, ice-cold, solution of sodium ethoxide in ethanol, prepared from 0.8 part of sodium and 10 parts of ethanol, was added a mixture of 1.0 part of 6-hydroxy-2-(2-hydroxypropoxy)-4-methoxy-acetophenone and 3.0 parts of diethyl oxalate in 10 parts of ethanol and 20 parts of diethyl ether. The mixture was stirred and heated under reflux for 4 hours.

After cooling diethyl ether and water were added, the aqueous layer was separated, acidified with dilute hydrochloric acid and extracted with ethyl acetate. The acetate solution was dried over sodium sulphate, filtered and evaporated to leave a brown oil.

This oil was dissolved in 15 parts of boiling ethanol and 0.2 part of concentrated hydrochloric acid was added. The solution was boiled for 10 minutes then evaporated to dryness to leave a brown oil.

This oil was extracted with diethyl ether to give 0.06 part of ethyl 5-(2-hydroxypropoxy)-7-methoxychromone-2-carboxylate as colourless needles, melting point 157° C.

*Analysis.*—Found: C, 60.06; H, 5.50%. $C_{16}H_{18}O_7$ requires: C, 59.62; H, 5.63%.

(c) *5-(2-hydroxypropoxy)-7-methoxychromone-2-carboxylic acid.*—A solution of 0.04 part of ethyl 5-(2-hydroxypropoxy)-7-methoxy-chromone-2-carboxylate and 1.0 part of sodium bicarbonate in 10 parts of ethanol and 30 parts of water was heated under reflux for 30 minutes. The solution was then cooled and acidified with dilute hydrochloric acid to give 0.03 part of 5-(2-hydroxypropoxy)-7-methoxychromone-2-carboxylic acid as a pale brown solid, melting point 196–8° (d.).

*Analysis.*—Found: C, 56.2; H, 4.4%. $C_{14}H_{14}O_7$ requires: C, 57.1; H, 4.8%.

(d) *Sodium 5-(2-hydroxypropoxy)-7-methoxychromone-2-carboxylate.*—A solution of 0.029 part of 5-(2-hydroxypropoxy)-7-methoxychromone-2-carboxylic acid and 0.0084 part of sodium bicarbonate in 10 parts of water was freeze-dried to give 0.029 part of sodium 5-(2-hydroxypropoxy)-7-methoxychromone-2-carboxylate as a white solid.

Example 26.—In vitro pharmacological anti-anaphylaxis results

The inhibition of release of histamine and slow reaction substance of anaphylaxis (SRS–A) has been estimated using the chopped, ovalbumin-sensitised, guinea-pig lung test. The test procedure followed the method described by Mongar and Schild (J. Physiol. 1957, 135, 301–19) and including the assay of SRS–A on the isolated guinea-pig ileum.

All the chromone-2-carboxylic acids exemplified above have been tested as their sodium salts and found to inhibit significantly the release of both histamine and SRS–A at a concentration of 200 μg./ml.

Example 27

The clinical evaluation of the following compounds was based on the antigen inhalation provocation test.

Disodium 5-(1,4-dioxa-5-oxoheptyl)chromone-2,7'-dicarboxylate,
Sodium 5-(2-hydroxypropoxy)chromone-2-carboxylate,
Sodium 5-(2-phenoxyethoxy)chromone-2-carboxylate,
Sodium 5-(2-hydroxypropoxy)-7-methylchromone-2-carboxylate,
Sodium 5-(2-ethoxyethoxy)chromone-2-carboxylate,
Sodium 5-(2-tetrahydrofurylmethoxy)chromone-2-carboxylate.

The human volunteers selected for test purposes suffered from specific allergic asthma. In these subjects an asthma attack normally followed the inhalation of an antigen to which they were specifically sensitive. The degree of asthma provoked by this method can be measured by repeated estimation of the air way resistance.

A suitably designed spirometer was used to measure the forced expiratory volume at one second ($F.E.V._{-1.0}$), hence the changes in air way resistance. The antiallergic activity of a compound is estimated from the difference between the maximum percent $F.E.V._{-1.0}$ reduction following control and test provocations after drug administration conducted under identical experimental conditions.

The results of the tests are expressed as percent protection according to the formula:

Percent protection =

$$100 \times \frac{\text{av. max. percent } F.E.V._{-1.0} \text{ full control shock} - \text{max. percent } F.E.V._{-1.0} \text{ fall test shock}}{\text{av. max. percent } F.E.V._{-1.0} \text{ fall control shock}}$$

With this test procedure the above listed compounds when inhaled as 0.5% aerosols (estimated dose retained in the lung less than 1.0 mg.) afforded over 70% protec-

I claim:
1. A member selected from the group consisting of chromone-2-carboxylic acids of the formula:

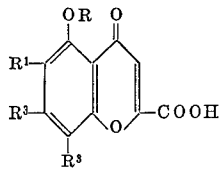

and physiologically acceptable alkali metal salts thereof, physiologically acceptable alkaline earth metal salts thereof and physiologically acceptable salts thereof with organic bases, lower alkyl esters thereof, amides thereof with ammonia, amides thereof with lower monoalkylamines, amides thereof with lower dialkylamines and amides thereof with amino acids, wherein R is a member selected from the group consisting of lower hydroxyalkyl, lower dihydroxyalkyl, lower alkoxyalkyl, lower alkoxyalkoxyalkyl, lower alkoxyhydroxyalkyl, lower phenoxyalkyl, lower carboxyalkyl, furfuryl, tetrahydrofurfuryl, dioxolanyl, lower alkyl-substituted dioxolanyl, glucosyl, ribosyl; $R'$ is a member selected from the group consisting of H, Cl, Br, lower alkyl, lower alkoxy, and, together with $R^2$ and the adjacent carbon atoms, is phenyl, cyclohexyl, cyclopentyl, cyclopropyl or furyl; $R^2$ is a member selected from the group consisting of H, Cl, Br, lower alkyl, lower alkoxy, and, together with $R^3$ and the adjacent carbon atoms, is phenyl, cyclohexyl, cyclopentyl, cyclopropyl or furyl, and $R^3$ is a member selected from the group consisting of H, Cl, Br, lower alkoxy and loweralkyl.

2. A compound according to claim 1, namely disodium 5-(1,4-dioxa-5-oxoheptyl)chromone-2,7'-dicarboxylate.

3. A compound according to claim 1, namely sodium 5-(2-hydroxypropoxy)chromone-2-carboxylate.

4. A compound according to claim 1, namely sodium 5-(2-phenoxyethoxy)chromone-2-carboxylate.

5. A compound according to claim 1, namely sodium 5-(2-hydroxypropoxy)-7-methylchromone-2-carboxylate.

6. A compound according to claim 1, namely sodium 5-(2-ethoxyethoxy)chromone-2-carboxylate.

7. A compound according to claim 1, namely sodium 5-(2-tetrahydrofurylmethoxy)chromone-2-carboxylate.

8. 5-(2-hydroxypropoxy)chromone-2-carboxylic acid.
9. 5-(2-phenoxyethoxy)chromone-2-carboxylic acid.
10. 5-(2-ethoxyethoxy)chromone-2-carboxylic acid.
11. 5-(2-hydroxypropoxy)-7-methylchromone-2-carboxylic acid.
12. 5-(2-acetoxypropoxy)[7-methyl]chromone-2-carboxylic acid.
13. 5-(tetrahydrofurylmethoxy)chromone-2-carboxylic acid.
14. 5-[4-(1,3-dioxnaylmethoxy]chromone-2-carboxylic acid.
15. 5,7-bis(2-ethoxyethoxy)chromone-2-carboxylic acid.
16. 4-(2-ethoxyethoxy)-9-methoxy-5-oxo-5H-furo[3,2-g][1]benzopyran-7-carboxylic acid.

References Cited
FOREIGN PATENTS
980,302  12/1950  France.

ALEX MAZEL, Primary Examiner.
J. H. TURNIPSEED, Assistant Examiner.

U.S. Cl. X.R
260—210, 340.9, 345.2; 424—278, 283